(12) United States Patent
Goodman et al.

(10) Patent No.: US 9,705,424 B2
(45) Date of Patent: Jul. 11, 2017

(54) ULTRASOUND TRANSDUCER WITH ACOUSTIC ISOLATOR AND CORRESPONDING MOUNTING METHOD

(75) Inventors: George David Goodman, Phoenixville, PA (US); Scott Pfeiffer Murta, Exton, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 287 days.

(21) Appl. No.: 14/004,843

(22) PCT Filed: Mar. 23, 2011

(86) PCT No.: PCT/US2011/029673
§ 371 (c)(1),
(2), (4) Date: Sep. 12, 2013

(87) PCT Pub. No.: WO2012/128765
PCT Pub. Date: Sep. 27, 2012

(65) Prior Publication Data
US 2014/0009033 A1    Jan. 9, 2014

(51) Int. Cl.
| | | |
|---|---|---|
| G01V 3/00 | (2006.01) |
| H04R 17/00 | (2006.01) |
| E21B 28/00 | (2006.01) |
| H02N 2/00 | (2006.01) |
| G01V 1/46 | (2006.01) |
| G10K 11/00 | (2006.01) |

(52) U.S. Cl.
CPC ............ *H02N 2/0055* (2013.01); *G01V 1/46* (2013.01); *G10K 11/002* (2013.01); *H02N 2/22* (2013.01); *Y10T 29/49826* (2015.01)

(58) Field of Classification Search
CPC ........ G01F 1/662; G01F 15/14; G10K 11/004
USPC ................... 340/384.6–384.73, 854.3–855.6; 166/177.1–177.2; 175/40–50, 24–25; 367/140–190, 81–86
See application file for complete search history.

(56) References Cited

U.S. PATENT DOCUMENTS

| | | | |
|---|---|---|---|
| 4,957,100 A | | 9/1990 | Herzog et al. |
| 5,644,186 A | * | 7/1997 | Birchak ............... G10K 11/004 310/337 |
| 5,737,963 A | * | 4/1998 | Eckert ................. G01F 23/2968 310/338 |
| 5,841,734 A | | 11/1998 | Ritter et al. |

(Continued)

FOREIGN PATENT DOCUMENTS

| | | |
|---|---|---|
| DE | 3941634 A1 | 6/1991 |
| DE | 9115793 U1 | 2/1992 |
| EP | 0766070 A1 | 4/1997 |

OTHER PUBLICATIONS

International Search Report and Written Opinion, International Application No. PCT/US2011/029673, 12 pgs., Jan. 16, 2012.

(Continued)

*Primary Examiner* — Jerold Murphy
(74) *Attorney, Agent, or Firm* — Benjamin Fite; Baker Botts L.L.P.

(57) ABSTRACT

An ultrasonic transducer device is disclosed. The device includes a body and an ultrasonic transducer mounted onto the body. The ultrasonic transducer comprises a shoulder and an O-ring placed on the shoulder. The O-ring substantially covers the interface between the ultrasonic transducer and the body.

20 Claims, 3 Drawing Sheets

(56) References Cited

U.S. PATENT DOCUMENTS

| | | | | |
|---|---|---|---|---|
| 6,244,361 B1 * | 6/2001 | Comeau | ................. | E21B 7/062 |
| | | | | 175/24 |
| 7,497,276 B2 * | 3/2009 | Pastusek | ................. | E21B 21/08 |
| | | | | 175/40 |
| 8,827,006 B2 * | 9/2014 | Moriarty | ................. | E21B 7/068 |
| | | | | 175/40 |

OTHER PUBLICATIONS

International Preliminary Report on Patentability issued in related PCT Application No. PCT/US2011/029673 mailed Sep. 27, 2012 (14 pages).

* cited by examiner

ULTRASOUND TRANSDUCER WITH ACOUSTIC ISOLATOR AND CORRESPONDING MOUNTING METHOD

RELATED APPLICATION

This application is a U.S. National Stage Application of International Application No. PCT/US2011/029673 filed Mar. 23, 2011, and is hereby incorporated by reference in its entirety.

BACKGROUND

As oil well drilling becomes increasingly complex, the importance of collecting and analyzing downhole data while drilling increases. Well logging instruments are often used to probe subsurface formations to determine formation characteristics.

Sonic tools are an example of well logging tools that may be used to provide information regarding subsurface acoustic properties that can be used to analyze the formation. This information may include the compressional wave speed, shear wave speed, borehole modes, and formation slowness. The information obtained by acoustic measurements has a number of applications, including, but not limited to, seismic correlation, petrophysics, rock mechanics and other areas.

During a typical sonic logging of a formation, an acoustic logging instrument or tool is lowered into a borehole that transverses the formation of interest. The acoustic logging tool may be mounted to the drill collar or other devices and directed downhole. Conventional acoustic logging tools include acoustic transducer elements such as a piezoelectric element. Generally, the acoustic transducer can convert electric energy to acoustic energy as well as acoustic energy to electric energy and may act as an acoustic source or an acoustic sensor. The acoustic logging tool typically includes a transmitter which performs as an acoustic source and emits acoustic energy into the formation and one or more receivers or acoustic sensors that receive acoustic energy. Once the acoustic logging tool is lowered into the formation, the transmitter may be periodically actuated to emit pulses of acoustic energy into the borehole. The emitted acoustic waves propagate through the borehole wall producing a reflection that is then detected by the receiver(s) which produce an electric signal in response. Attributes of the acoustic energy that is detected at the receiver(s) may then be used to characterize subsurface properties of the formation of interest.

However, the receiver(s) of the acoustic logging tool are typically also sensitive to undesired acoustic noise that may result from normal drilling operations. For instance, the undesired acoustic noise may propagate with reduced attenuation through the hard steel drill collar. The acoustic noise may then couple to the receiver of the acoustic logging tool and be converted into electrical noise along with the desired signal. This background noise may be a result of the downhole operations or produced by other acoustic sources and therefore, may introduce an error in the measurements by the acoustic logging tool. It is therefore desirable to provide an acoustic logging tool that can minimize or eliminate the susceptibility of the acoustic logging tool to the background noise.

DETAILED DESCRIPTION

The terms "couple" or "couples," as used herein are intended to mean either an indirect or direct connection. Thus, if a first device couples to a second device, that connection may be through a direct connection, or through an indirect electrical connection via other devices and connections. The term "uphole" as used herein means along the drillstring or the hole from the distal end towards the surface, and "downhole" as used herein means along the drillstring or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface.

Illustrative embodiments of the present invention are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells.

Figure 1:
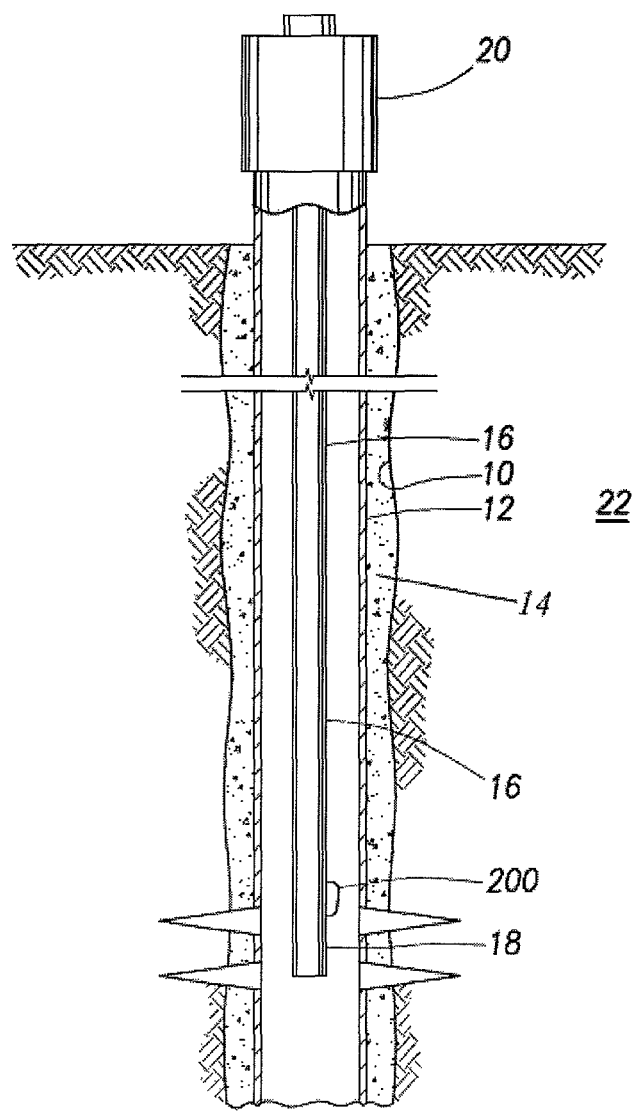
FIG. 1 illustrates a cross sectional view of a well bore disposed in a subterranean formation in which an embodiment of the disclosed invention may be used.

In an embodiment, the apparatus of the present disclosure may be used in a well bore disposed in a subterranean formation. In an embodiment shown in FIG. 1, a well bore 10 may be created so as to extend into a subterranean formation 22. In one embodiment, a casing 12 may be disposed within the well bore and cement 14 may be introduced between the casing 12 and the well bore 10 walls in order to hold the casing 12 in place and prevent the migration of fluids between the casing 12 and the well bore 10 walls. A tubing string 16 may be disposed within the casing 12. In an embodiment, the tubing string 16 may be jointed tubing, coiled tubing, or any other type of tubing suitable for use in a subterranean well environment. Suitable types of tubing and an appropriate choice of tubing diameter and thickness may be known to one skilled in the art, considering factors such as well depth, pressure, temperature, chemical environment, and suitability for its intended use. In an embodiment, a hydraulic workover unit 20 may be disposed at or near the top of the tubing string 16, the casing 12, or both. The hydraulic workover unit 20 may allow for tubing and other items to be introduced into the well bore 10 while pressure exists and is maintained within the well bore 10 and tubing string 16. The existence of pressure within the well bore may be referred to as a live well condition.

The tubing string 16 may include the drill collar 18 which is a component that provide weight on the bit for drilling and may be part of the Bottom Hole Assembly ("BHA"). Drilling related measurements may be performed downhole and information transmitted to the surface while drilling the well. Such measurements are typically referred to as Measurement While Drilling ("MWD") operations. MWD tools may be conveyed downhole as part of the BHA. The tools used for MWD may be contained inside the drill collar 18 or built into the collar 18. One of the tools used for MWD is a collar mounted ultrasonic transducer 200 which may be mounted onto the drill collar 18.

Devices and methods in accordance with certain embodiments may be used in one or more of wireline, MWD and logging-while-drilling (LWD) operations. MWD is the term for measuring conditions downhole concerning the movement and location of the drilling assembly while the drilling continues. "Logging-while-drilling" is the term for similar techniques that concentrate more on formation parameter measurement.

Figure 2:
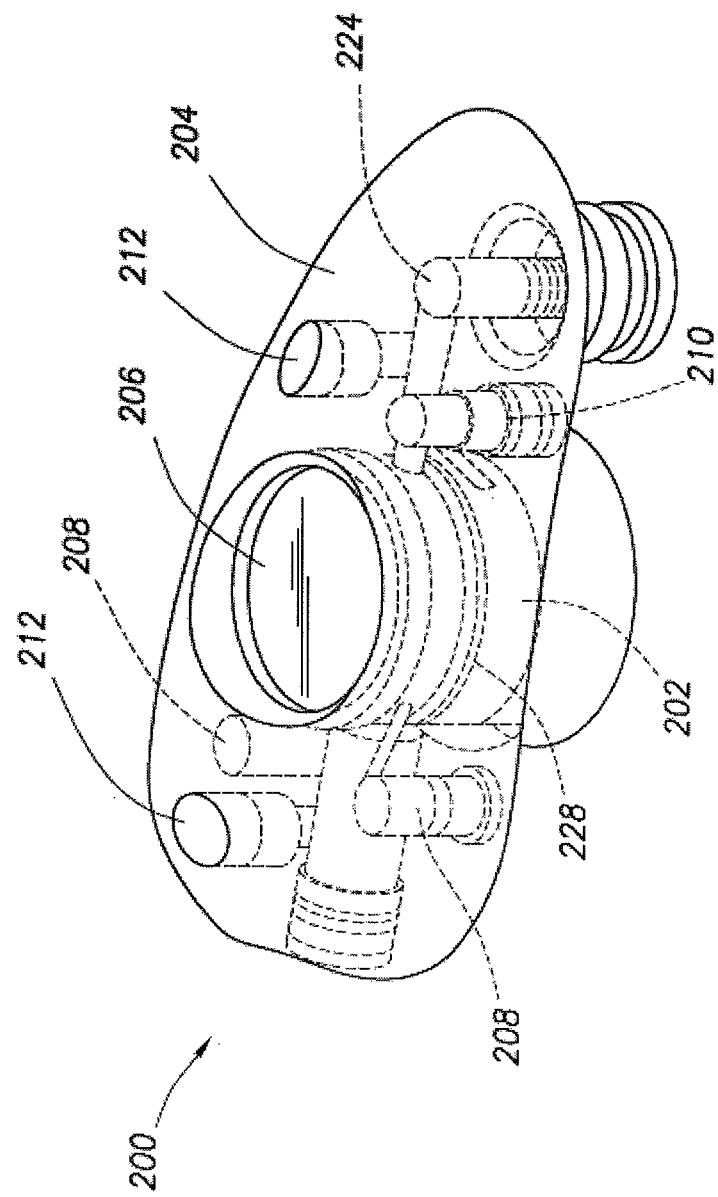
FIG. 2 shows an ultrasonic transducer in accordance with an exemplary embodiment of the present invention.

Turning now to FIG. 2, a collar mounted ultrasonic transducer in accordance with an exemplary embodiment of the present invention is denoted generally with reference numeral 200. As would be appreciated by those of ordinary skill in the art, with the benefit of this disclosure, the ultrasonic transducer may be mounted to the drill collar 18 or any other device which may convey the transducer into the wellbore.

The collar mounted ultrasonic transducer 200 may include an ultrasonic transducer 202 that is mounted onto a body 204 which couples the ultrasonic transducer to the drill collar 18 or another conveying device. The ultrasonic transducer 202 may include a diaphragm 206 that may emit a sonic or ultrasonic acoustic wave when excited by an Alternate Current ("AC") voltage. In one embodiment, the diaphragm may be a metal diaphragm. The transducer may further include a piezoelectric element (not shown) disposed on a silicon sensor (not shown) which may exhibit a change in resistance when subjected to force or pressure. In one embodiment, oil or other suitable fluid may be used as the force transmitting medium in the ultrasonic transducer 202 between the diaphragm 206 and the piezoelectric element. Accordingly, the diaphragm 206 may communicate with a silicon pressure sensor located inside the ultrasonic transducer 202 through an oil filled reservoir which is contained in an internal hollow in the transducer 202 housing.

As shown in FIG. 2, the ultrasonic transducer 202 may be coupled to a body 204 that includes an oil compensation system. As would be appreciated by those of ordinary skill in the art, with the benefit of this disclosure, the oil compensation system reduces errors that may arise during the transmission of acoustic waves from the diaphragm 206 to the piezoelectric element and the silicon sensor inside the transducer 202. Specifically, the oil compensation system keeps the O-ring 228 from over compressing or becoming too loose of a fit and maintains the O-ring loading at the most desired elastic operation point thereby maintaining its optimum acoustic properties. As shown in FIG. 2, in one embodiment, the oil compensation system may include two pistons 208, a pressure relief valve 210, and two oil fill ports 212. A shut off valve may be integrated into the oil fill ports 212 to optimize oil fill.

The pressure compensated system allows the desired load-bearing surface to remain relatively constant over the full range of borehole pressures. Specifically, the oil compensation system maintains a relatively constant differential pressure (gauge pressure) across the O-ring 228 seal. Typically, ambient temperature and pressure may increase with increasing depth within the borehole. The pistons 208 provide a seal between the external borehole fluid and the relatively incompressible fluid, typically oil, that is internal to the tool. When the ambient pressure within the borehole increases, the pistons 208 tend to compress the oil, keeping the absolute pressure within the transducer assembly similar to the external borehole ambient pressure. However, when the oil expands, for instance, due to increasing temperature, the pistons 208 transverse towards the borehole fluid while maintaining similar pressure inside and outside of the tool and keeping the two fluids physically separated.

Figure 3:
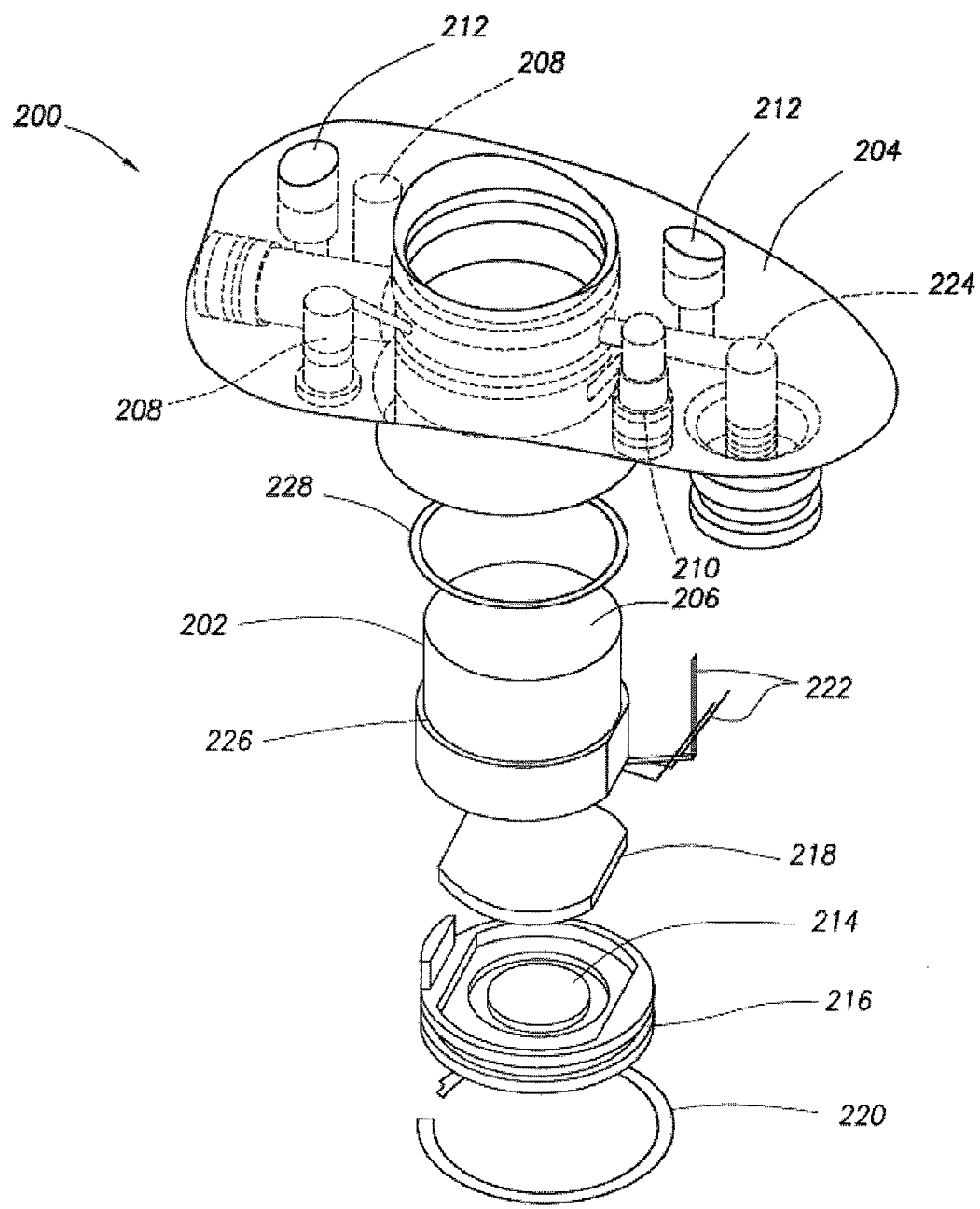
FIG. 3 shows an exploded view of the ultrasonic transducer of FIG. 2.

FIG. 3 is an exploded view of the collar mounted ultrasonic transducer 200 of FIG. 2. As shown in FIGS. 2 and 3, the ultrasonic transducer 202 is coupled to the body 204 in a spring-loaded manner that provides a single load bearing contact that is isolated with an O-ring 228. In one embodiment, the ultrasonic transducer 202 may be inserted into a cavity in the body 204 as shown in FIG. 3. The ultrasonic transducer 202 may include a shoulder 226 around its outer perimeter. The shoulder 226 corresponds to the portion of the ultrasonic transducer 202 that interfaces with the body 204. A dampening O-ring 228 slides over the perimeter of the ultrasonic transducer 202 and sits on the shoulder 226. Accordingly, the dampening O-ring 228 substantially covers the interface between the ultrasonic transducer 202 and the body 204. As shown in FIG. 3, a spring 214 is placed in a retaining cap 216 and a spacer 218 is mounted on top of the spring 214. The retaining cap 216 may then slide into the body 204, allowing it to load against the ultrasonic transducer 202. In one embodiment, a locking retaining ring 220 may hold the ultrasonic transducer 202 captive with the desired bearing force applied to the O-ring 228.

The dampening O-ring 228 may be selected to provide a poor acoustic impedance match between the body 204 and the ultrasonic transducer 202 housing. As a result, acoustic energy is mostly reflected at the interface between the ultrasonic transducer 202 and the body 204 thereby reducing the undesired acoustic energy that couples to the ultrasonic transducer 202 from the body 204.

As would be appreciated by those of ordinary skill in the art, with the benefit of this disclosure, the O-ring 228 may be made of any suitable materials. In one embodiment, the O-ring 228 may be selected to provide a high loss medium for the acoustic wave. Although an O-ring 228 is depicted in FIG. 3, as would be appreciated by those of ordinary skill in the art, with the benefit of this disclosure, any other gasket materials may be used without departing from the scope of the present invention. Moreover, the O-ring 228 or other gasket materials may be made from any suitable material that may be selected based on, for example, the pressure ranges, acoustic properties of the transducer housing and the operating frequency of the device. For instance, the O-ring 228 or other gasket materials may be made from any suitable materials, such as, for example, Nitrile and Fluoroelastomer. The use of high loss materials further optimizes the design by dampening undesired acoustic waves.

Additionally, the oil compensation system provides a relatively constant mechanical load which permits the O-ring 228 to maintain its desirable acoustic properties. The oil-filled spring loaded assembly is also conductive to acoustic isolation making the O-ring 228 interface the primary conduction path by its design. Accordingly, the ultrasonic transducer 202 may be mounted in the body 204 in a manner that minimizes or eliminates its susceptibility to undesired conducted noise that results from coupling the ultrasonic transducer to the drill collar or other devices. Consequently, the signal-to-noise performance of the system is improved and the detection of false echo signals is minimized.

As would be appreciated by those of ordinary skill in the art, with the benefit of this disclosure, the ultrasonic transducer 202 may further include terminals 222 and a connector 224 on the body 204 to permit the transmission of electric signals between the ultrasonic transducer 202 and the body 204. The processing of signals received from the ultrasonic transducer 202 is well known in the art and will not be discussed in detail herein.

As would be appreciated by those of ordinary skill in the art, with the benefit of this disclosure, in some example systems, power may be transmitted to the collar mounted ultrasonic transducer 200 and associated instrumentation through conductors of the wireline, string of pipe, coiled tubing, or equivalent means from a power source at the surface. In other example systems, the collar mounted ultrasonic transducer 200 may be powered from a downhole central power module, which may utilize a battery or other power source.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. An ultrasonic transducer device comprising: a body; an ultrasonic transducer mounted onto the body to have a single mechanical load bearing interface ("single interface") with the body;
wherein the ultrasonic transducer comprises a shoulder corresponding to the single interface, a diaphragm and a piezoelectric element disposed on a sensor, wherein the diaphragm emits a sonic or ultrasonic acoustic wave when excited;
an O-ring placed on the shoulder;
wherein the O-ring substantially covers the single interface between the ultrasonic transducer and the body;
wherein the O-ring comprises a gasket that provides an acoustic impedance mismatch between a housing of the ultrasonic transducer and the body so that acoustic energy is reflected at an interface between the ultrasonic transducer and the body; and
an oil compensation system to adjust a pressure bearing on the O-ring, wherein the oil compensation system provides a constant mechanical load which permits the O-ring to maintain the acoustic impedance mismatch provided by the O-ring.

2. The ultrasonic transducer device of claim 1, further comprising:
a spacer located between the ultrasonic transducer and a retaining cap; and
a spring located between the retaining cap and the spacer; wherein the retaining cap is coupled to the body; and
wherein the retaining cap is loaded against the ultrasonic transducer.

3. The ultrasonic transducer device of claim 1, further comprising a terminal for transmission of electric signals from the ultrasonic transducer to the body.

4. The ultrasonic transducer device of claim 1, wherein the oil compensation maintains a relatively constant differential pressure across the O-ring.

5. The ultrasonic transducer device of claim 4, wherein the oil compensation system comprises at least one piston, a pressure relief valve and at least one oil fill port.

6. The ultrasonic transducer device of claim 1, wherein the body is mounted onto a drill collar.

7. The ultrasonic transducer of claim 6, wherein the ultrasonic transducer is inserted into a cavity in the body.

8. The ultrasonic transducer of claim 6, further comprising:
a spacer located between the ultrasonic transducer and a retaining cap; and
a spring located between the retaining cap and the spacer; wherein the retaining cap is coupled to the body; and
wherein the retaining cap is loaded against the ultrasonic transducer.

9. The ultrasonic transducer of claim 6, wherein the oil compensation maintains a relatively constant differential pressure across the gasket.

10. The ultrasonic transducer of claim 6, wherein the oil compensation system comprises at least one piston, a pressure relief valve and at least one oil fill port.

11. The ultrasonic transducer of claim 1, wherein the gasket comprises an acoustic impedance that is mismatched from the acoustic impedance of the ultrasonic transducer and the acoustic impedance of the body to reduce a transfer of acoustic energy between the body and the ultrasonic transducer.

12. The ultrasonic transducer device of claim 1, wherein the O-ring is made from a material selected from the group consisting of Nitrile and Fluoroelastomer.

13. A method of acoustically isolating an ultrasonic transducer from a body comprising:
providing an ultrasonic transducer having a shoulder on a perimeter of the ultrasonic transducer, a diaphragm and a piezoelectric element disposed on a sensor, wherein the diaphragm emits a sonic or ultrasonic acoustic wave when excited;
selecting a gasket based, at least in part, on an acoustic impedance mismatch between the ultrasonic transducer and the body, wherein the selected gasket provides acoustic isolation;
sliding the selected gasket over the ultrasonic transducer so that the gasket sits on the shoulder; and
coupling the ultrasonic transducer with the body so that the ultrasonic transducer and the body have a single mechanical load bearing interface ("single interface") corresponding to the shoulder, wherein coupling the ultrasonic transducer with the body comprises inserting the ultrasonic transducer into a cavity in the body;
wherein the body comprises an oil compensation system to adjust a pressure bearing on the gasket, wherein the oil compensation system provides a constant mechanical load which permits the O-ring to maintain the acoustic impedance mismatch provided by the O-ring.

14. The method of claim 13, wherein the gasket is made from a material selected from the group consisting of Nitrile and Fluoroelastomer.

15. The method of claim 13, wherein the body is mounted onto at least one of a wireline logging tool or a drill collar.

16. The method of claim 13, wherein selecting the gasket based, at least on part, on the acoustic impedance of the ultrasonic transducer and the acoustic impedance of the body comprising selecting the gasket to provide mismatches between an acoustic impedance of the gasket and the acoustic impedance of the ultrasonic transducer, and between the acoustic impedance of the gasket and the acoustic impedance of the body to reduce a transfer of acoustic energy between the body and the ultrasonic transducer.

17. The method of claim 13, wherein the oil compensation system maintains a relatively constant differential pressure across the gasket.

18. The method of claim 17, wherein the oil compression system comprises:
   at least one piston;
   a pressure relief valve; and
   at least one oil fill port.

19. The method of claim 13, wherein inserting the ultrasonic transducer into the cavity in the body comprises mounting the ultrasonic transducer onto the body using a spring loaded retaining cap.

20. The method of claim 19, wherein the spring loaded retaining cap comprises:
   a spring placed inside the retaining cap;
   a spacer mounted on the spring;
      wherein the spacer is located between the spring and the ultrasonic transducer; and
   a retaining ring;
      wherein the retaining ring holds the spring loaded retaining cap in place.

* * * * *